United States Patent [19]

Beaudet

[11] Patent Number: 4,504,976

[45] Date of Patent: Mar. 12, 1985

[54] DEVICE FOR REGULATING A LASER DIODE

[75] Inventor: Didier Beaudet, St. Maur des Fosses, France

[73] Assignee: Societe Anonyme De Telecommunications, Paris

[21] Appl. No.: 491,223

[22] Filed: May 3, 1983

[30] Foreign Application Priority Data

May 6, 1982 [FR] France ................................ 82 07845

[51] Int. Cl.³ .............................................. H04B 9/00
[52] U.S. Cl. ..................................... 455/611; 372/31; 372/33; 455/613; 455/618
[58] Field of Search ............... 455/606, 607, 609, 610, 455/611, 613, 617, 618; 372/26, 29, 31, 33; 332/7.51

[56] References Cited

U.S. PATENT DOCUMENTS 4,211,929  7/1980  Tamburelli .......................... 455/618

FOREIGN PATENT DOCUMENTS 2025121  1/1980  United Kingdom .................. 372/29

*Primary Examiner*—Joseph A. Orsino, Jr.
*Attorney, Agent, or Firm*—Holman & Stern

[57] ABSTRACT

The present invention relates to a device for regulating a laser diode, which comprises a generator of a pilot frequency signal modulated by a reference signal forming part of a composite signal to be emitted and a gain regulator of the composite signal. The regulation circuit comprises a photodiode whose output signal is demodulated by means of the pilot frequency signal, filtered then detected before being applied to the gain regulator.

3 Claims, 1 Drawing Figure

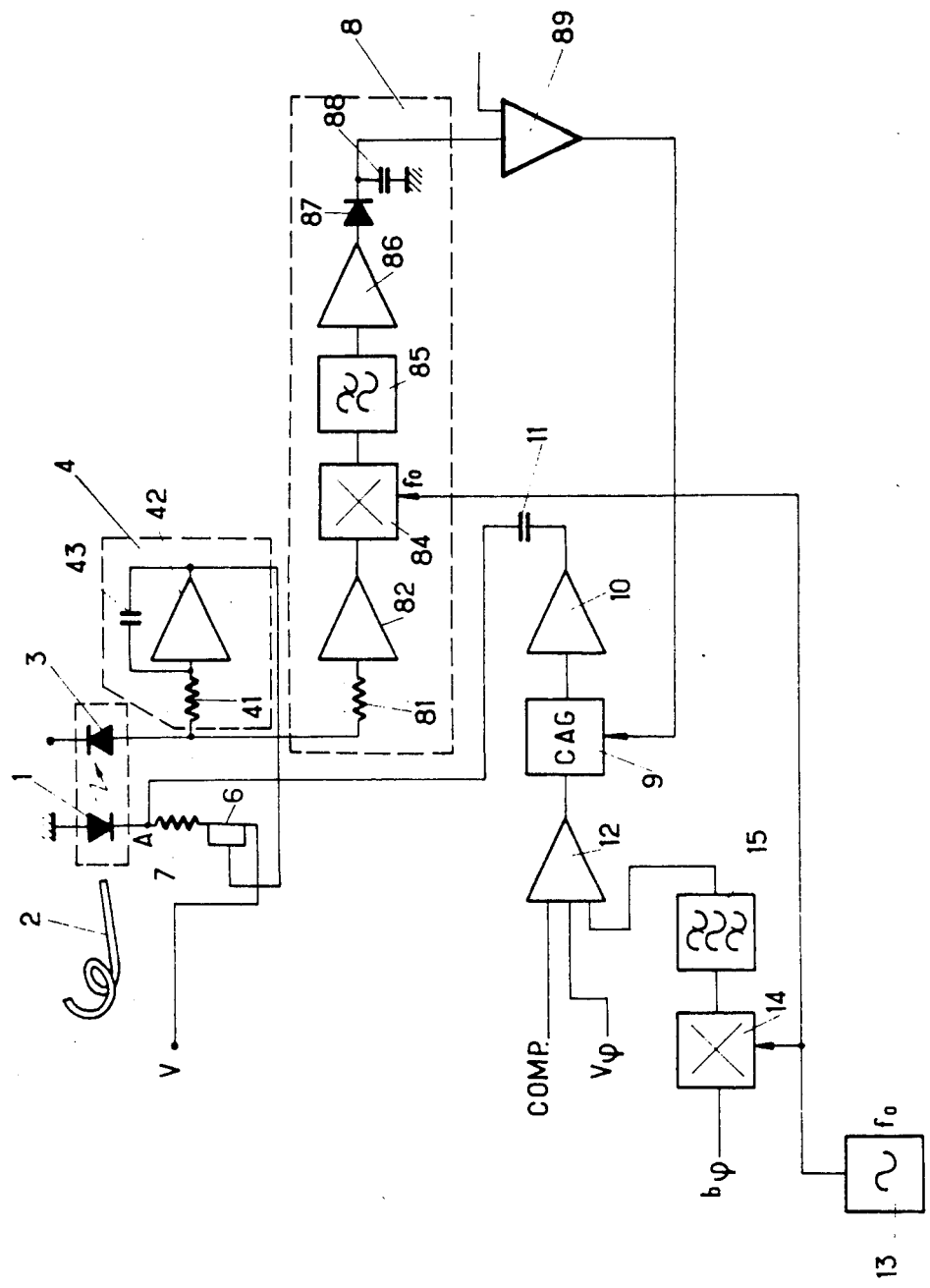

DEVICE FOR REGULATING A LASER DIODE

BACKGROUND OF THE INVENTION

The present invention relates to a device for regulating an emitting laser diode adapted to receive, via coupling means and amplification means, a composite signal, comprising a control photodiode for collecting the light power emitted by the diode and means for processing the signal delivered by the photodiode to control the power emitted by the laser diode.

Such a device is for example virtually described in British Patent Application No. 2 025 121. However, here, there is no question of emitting a composite signal. When such a composite signal is emitted (videophone, high fidelity, television), the signal varies as the component signals are not always present since they appear only at the request of a subscriber, for example. In that case the known regulating devices are no longer acceptable.

It is an object of the invention to overcome the drawbacks of these devices.

SUMMARY OF THE INVENTION

To this end, the present invention relates to a system of the type specified hereinabove, characterized in that a generator of a pilot frequency signal is provided, this pilot signal is modulated by a digital reference signal which is always present, before being coupled to the composite signal, the processing means comprise means for demodulating, by the pilot frequency signal, the signal delivered by the photodiode, filtering and detection means within range of the demodulation means, and means for regulating the gain of the composite signal, between the coupling means and the amplification means, and controlled by the filtering and detection means.

The invention therefore consists in controlling the luminous power emitted by a signal calibrated in amplitude, namely at the carrier frequency of the reference signalling signal. In fact, whatever the type of the other signals (videophone image, television, hi-fi) which may be modulated in frequency, the reference signalling signal is a signal modulated in amplitude therefore calibrated in amplitude with the greatest precision. Moreover, this signalling signal is always present.

The present invention also comprises means for detecting the peak amplitude of this signalling signal and means for regulating the gain of the control amplifier of the laser diode. This makes it possible to regulate the luminous excursion of the component incident signals which are connected to the amplitude of the carrier frequency of the reference signalling signal by a predetermined natural ratio.

The invention therefore uses one of the signals of the composite signal to control the luminous power of the laser diode.

BRIEF DESCRIPTION OF THE DRAWINGS

The invention will be more readily understood on reading the following description with reference to the accompanying drawings, in which:

The single FIGURE shows a diagram of the emission head of a subscriber's interface according to the invention.

DETAILED DESCRIPTION OF A PREFERRED EMBODIMENT OF THE INVENTION

Referring now to the FIGURE, a laser diode 1 furnishes a light beam at the input of a pigtail 2 from the electric signal applied to point A, coming from electrical members located upstream. A photodiode PIN 3 located in the axis of the emission of light and on the side of the laser diode 1 opposite that of the pigtail 2, receives the same light flux as the latter and delivers a current proportional to the light power emitted. In manner known per se, a circuit 4 formed by a resistor 41 placed in series with an amplifier whose input and output are connected to the terminals of a capacitor 43, makes it possible to know the mean power emitted by the laser diode and therefore to regulate the mean optical power. A quadripole 6 converts the signal furnished by this circuit 4 into a direct current which is applied to the laser diode 1 via a resistor 7. A supply voltage V is applied to this quadripole 6.

The n signals to be applied at A on the laser diode 1 may present very different levels. For example, there may be $(n-1)$ signals modulated in frequency, present or not and an $n^{th}$ reference signal. This reference signal is formed from all or nothing coded digital information modulating a pilot. This reference signal is always present.

In the example of the present invention, the n signals are applied to the input of a coupler 12 which couples them by summation: a first composite signal COMP situated in the frequency band 2 to 90 MHz is formed from television signals TV1, TV2 and high fidelity signals Hi-Fi 1, Hi-Fi 2 for example. A second videophone image signal $V_\phi$ is also applied to the input of the coupler 12. The signals COMP and $V_\phi$ are modulated in frequency. A last signal $b_\phi$ is applied according to the invention to the input of this coupler 12 after modulation by the carrier frequency $f_o$ furnished by the generator 13 and filtering by means of filter 15. This signal $b_\phi$ is a digital signal, for example with a rate of 128 kbit/s representing multiplexed signalling information possibly with videophone sound information. It is advantageously coded according to a code of zero mean power, without D.C. component (CMI, biphase). This carrier or pilot frequency $f_o$ is advantageously chosen to be equal to 4096 kHz.

The composite signal issuing from the coupler 12 is therefore applied to the input of an automatic gain control (AGC) 9 then amplified by the amplifier 10 and finally applied at point A to the terminal of the laser diode 1 via a capacitor 11, which modulates the electric signal at A. The optical signal emitted by the diode 1 is then a modulated signal of wave length $\lambda$ specific of the laser diode.

The A.C. signal issuing from the photodiode 3 is also applied according to the invention to the input of a circuit 8. This circuit 8 is essentially formed by a resistor 81 connected to the input of an amplifier 82 whose output is connected to the input of a demodulator 84. The demodulation carrier frequency $f_o$ comes from the generator 13. At the output of the demodulator 84, the signal is filtered by the filter 85 in order to restore the digital wave of the signal. A low-pass filter is chosen to this end. This digital signal is amplified by an amplifier 86 then detected.

The circuit for detecting the peak amplitude information is for example formed by a diode 87 and a capacitor 88. This peak amplitude information is compared with a reference voltage by means of a comparator 89 and the amplified error voltage is applied to the input of the automatic gain control AGC 9.

The functioning of the device of the invention explains the function of each circuit. The current of the photodiode 3 applied to the input of the circuit 4 is proportional to the luminous power emitted by the laser diode 1 in the pigtail 2. The circuit 4 regulates the conditions of conduction of the quadripole 6. The device 8 furnishes D.C. current (or voltage) information which is proportional to the peak amplitude indicative of the amplitude of the biphase signal and which corrects the gain of the quadripoles. This information issuing from the device 8 controls quadripoles located downstream of the coupler 12 by adjusting the AGC 9 so that the luminous power emitted by the laser diode 1 is constant.

Let us assume that the current detected by this photodiode 3 is excessive, in which case the signal issuing from device 8 reduces the gain of the automatic gain control (AGC) 9. Consequently, the level of the A.C. modulation light signal is constant, whatever the operational conditions.

The process for detecting the information borne by the pilot by a demodulation by the same carrier frequency as that of the pilot, demodulation advantageously followed by a filtering, makes it possible to be independent of the carrier frequencies adjacent the frequency of the pilot, present or not. Such a detection would be very difficult to effect with the adjacent subcarriers presenting levels much higher than that of the pilot frequency; the cuts must be clean and be maintained without appreciable drops up to 100 MHz. The process and the device 8 of the invention enable this detection to be obtained more easily.

The present invention has been described in its application to laser diodes, but it is also applicable to electroluminescent diodes or to any light emitting means from which part of the light may be extracted, the proportion of light extracted being known and chosen to be small. Thus for example the light signal emitted may be applied to a coupler, the luminous power extracted by the other branch of the coupler being in a ratio 10%-90% with the light emitted in the pigtail.

The process according to the invention and the device for carrying it out are applicable both to digital and analog transmissions of light information.

What is claimed is:

1. Apparatus for regulating emissions from a laser diode comprising:
   a luminous energy-emitting laser diode;
   a control photodiode for collecting luminous energy emitted by said laser diode and providing a photodiode signal as a function of the collected energy;
   feedback means responsive to said photodiode signal for controlling the energy emitted by said laser diode;
   generator means for providing a pilot signal at a pilot frequency;
   modulation means for modulating said pilot signal with a digital pulse train to provide a modulated pilot signal;
   coupling means for combining said modulated pilot signal with a composite signal to provide a first signal as a function of the combined modulated pilot signal and the composite signal;
   automatic gain control means responsive to application of a gain control signal thereto for automatically regulating the amplitude of said first signal;
   means for modulating the luminous energy emitted by said laser diode as a function of said amplitude-regulated first signal;
   demodulator means for demodulating said photodiode signal with said pilot signal to provide a demodulated signal; and
   filtering and detection means for filtering and detecting said demodulated signal to provide said control signal applied to said automatic gain control means.

2. The apparatus according to claim 1 wherein said coupling means is a signal summing circuit for summing the amplitudes of said modulated pilot signal and said composite signal.

3. The apparatus according to claim 1 further comprising amplifier means for amplifying the amplitude-regulated first signal prior to modulation thereby of the energy emitted by said laser diode.

* * * * *